(No Model.)
W. GUETHLER & F. GELLHAUS.
ICE VELOCIPEDE.
No. 467,737. Patented Jan. 26, 1892.
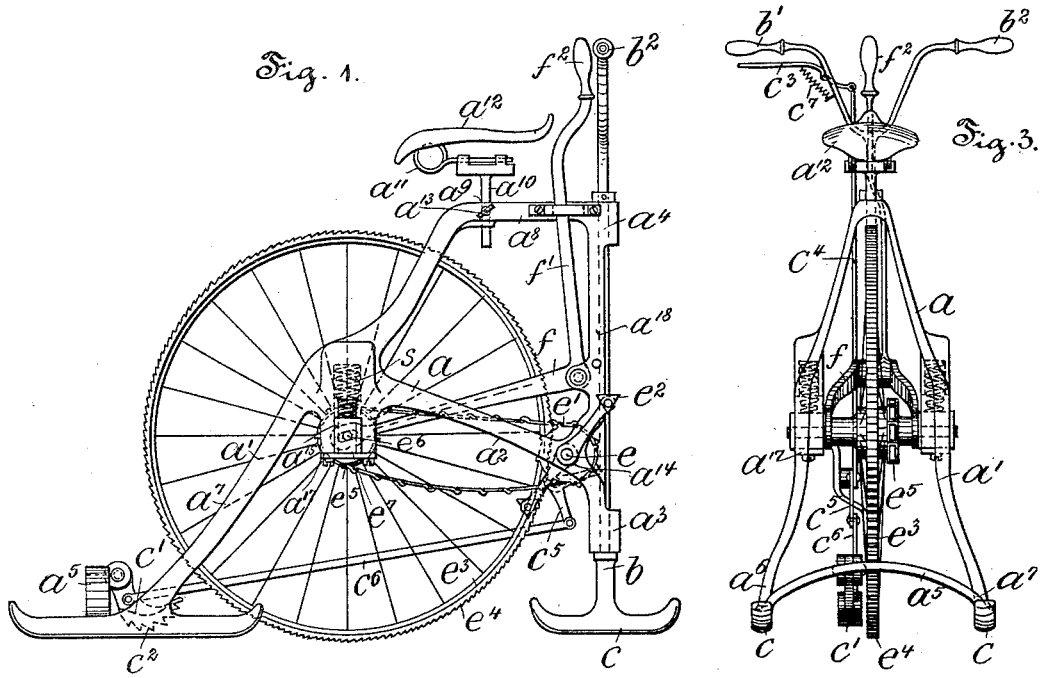
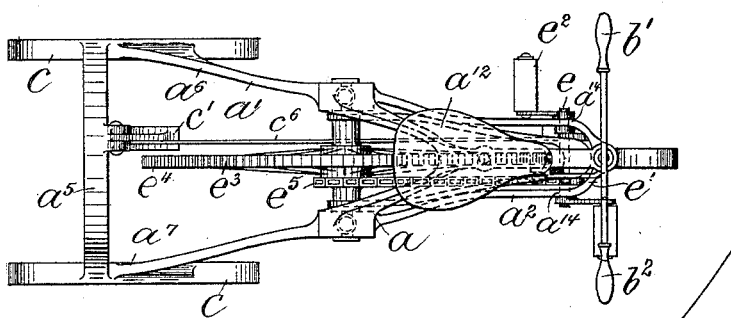
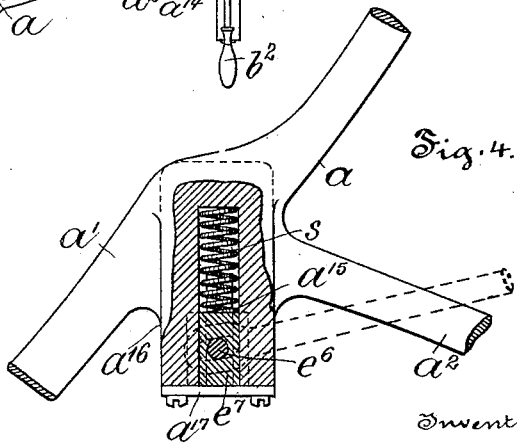
Witnesses
Hermann Bormann
Thomas M. Smith
Inventors:
William Guethler, Frank Gellhaus.
by J. Walter Douglass
THE NORRIS PETERS CO., PHOTO-LITHO., WASHINGTON, D. C.

UNITED STATES PATENT OFFICE.

WILLIAM GUETHLER AND FRANK GELLHAUS, OF PHILADELPHIA, PENNSYLVANIA.

ICE-VELOCIPEDE.

SPECIFICATION forming part of Letters Patent No. 467,737, dated January 26, 1892.

Application filed November 12, 1891. Serial No. 411,650. (No model.)

*To all whom it may concern:*

Be it known that we, WILLIAM GUETHLER and FRANK GELLHAUS, both citizens of the United States, residing at the city of Philadelphia, in the county of Philadelphia and State of Pennsylvania, have jointly invented certain new and useful Improvements in Sleds and Propelling Mechanism Therefor, of which the following is a specification.

The present invention relates in general to sleds and propelling mechanism therefor; and it relates more particularly, first, to the form and construction of the body of the sled; second, to the construction and arrangement of certain of the parts of the propelling mechanism, and, third, to the means for connecting the sled and propelling mechanism.

In our present invention use is made of a driving-wheel having a roughened tread adapted to engage the ice or snow over which the sled is traveling in connection with means for rotating said wheel. In such an apparatus it is important that the roughened tread of the driving-wheel should not slip upon the ice or snow, otherwise a great deal of unnecessary labor and exertion are expended in rotating the driving-wheel at an abnormally high rate of speed without causing a corresponding increase in the velocity of the sled. Of course this objectionable feature may be avoided by causing the roughened surface of the tread to be deeply embedded in the ice or snow. However, in such case labor and energy, which would otherwise be available for propelling the sled, are wasted in forcing the tread of the driving-wheel into the snow or ice.

The principal object of our present invention is to obviate the above-mentioned defects and disadvantages and to provide a simple, light, durable, and comparatively inexpensive sled that may be propelled at a maximum rate of speed by the expenditure of a minimum amount of force or energy.

Our invention consists of a sled provided with a driving-wheel whose axle is afforded a free range of play in a downward direction in contradistinction to one in which such motion of the axle is opposed by rigid connections or by the resiliency of springs and having pedals and sprocket-gearing for actuating said driving-wheel and spiral springs interposed between the axle of the driving-wheel and the frame of the sled for normally shifting the periphery of the wheel beneath the plane of the runners, and thus insuring the proper engagement of the former with the ice or snow when the sled is loaded.

Our invention further consists in the improvements in sleds and propelling mechanism therefor hereinafter fully described, and pointed out in the claims.

The nature and characteristic features of our present invention will be more fully understood from the following description, taken in connection with the accompanying drawings, forming part hereof, in which—

Figure 1 is an elevation of a sled and its propelling mechanism, showing a driving-wheel afforded a perfectly free range of motion in a downward direction and also showing spiral springs interposed between the journals of the driving-wheel and the sled for normally shifting the periphery of the former beneath the plane of the runners of the sled. Fig. 2 is a top or plan view of Fig. 1, showing the construction of the body of the sled and also illustrating the connections between the body and driving-wheel. Fig. 3 is an end view of Fig. 1, showing braking mechanism for checking the velocity of the sled; and Fig. 4 is a sectional view, on an enlarged scale, showing the detail construction of the boxes and their accessories for supporting the journals of the driving-wheel.

In the drawings, $a$ is the body or framework of the sled. This frame-work comprises a bifurcated backbone $a'$, provided with a forwardly-extending arm $a^2$, adapted to form a seat $a^3$ for the lower portion of a rotatable steering-head $b$. The upper portion of the steering-head $b$ is supported in a seat $a^4$, formed in the forward portion of the backbone $a'$, and is provided with transversely-ranging handles $b'$ and $b^2$.

$a^5$ is a brace or distance piece connected at its respective extremities with the lower portions of the bifurcations $a^6$ and $a^7$ of the backbone $a'$ in order to spread the same and increase the rigidity of the main frame. The lower portions of the bifurcations $a^6$ and $a^7$ and the steering-head $b$ are provided with runners $c$, having the front and rear extremities thereof turned or curved upward and having the shoes thereof slightly convex or rounded, as shown in Fig. 3, in order to permit them to ride freely over ice or snow. The upper portion of the backbone $a'$ is provided with a projection $a^8$, having an aperture $a^9$ therein.

$a^{10}$ is a post working in the aperture $a^9$, and is connected by means of a spring $a^{11}$ with a saddle $a^{12}$.

$a^{13}$ is a set-screw for clamping the post $a^{10}$ to place in the aperture $a^9$ and for permitting of the adjustment of the saddle $a^{12}$ upward or downward to accommodate riders of different sizes.

The hereinabove-described arrangement of the saddle $a^{12}$ and its accessories is adapted for the use of boys and men; but the saddle $a^{12}$ may be readily adapted for the use of women and girls by dispensing with the forward portion $a^8$ of the backbone $a'$ adjacent to the steering-head $b$ and supporting the latter wholly by means of the arms $a^2$.

$c'$ is a brake-shoe pivotally connected at or near the center thereof with the brace $a^5$ and provided at one of its extremities with a serrated working surface $c^2$, adapted to engage with the ice or snow, and thus serve as a brake for checking the velocity of the sled.

$c^3$ is an operating-lever pivotally connected at or near the center thereof with the handle $b'$ and having the free extremity thereof adjacent to the hand of the rider and the other extremity thereof connected by means of a link $c^4$ with one arm of a bell-crank lever $c^5$. The other arm of the bell-crank lever $c^5$ is connected with the brake-shoes $c'$ by means of a rod $c^6$.

$c^7$ is a spring interposed between the operating-lever $c^3$ and the handle $b'$ in order to cause the serrated working surface $c^2$ of the brake-shoe to normally occupy a position out of range of the ice or snow, as shown in the drawings. However, this serrated working surface may be readily shifted into contact with the ice or snow by the simple operation of pressing the free extremity of the operating-lever $c^3$ toward the handle $b'$.

The propelling mechanism for the hereinabove-described sled comprises a shaft $e$, provided with a driving sprocket-wheel $e'$ and with pedals $e^2$, a driving-wheel $e^3$, having a roughened tread $e^4$ for engaging the snow and ice and provided with a following sprocket-wheel $e^5$, and a sprocket-chain for transmitting motion from said driving to said driven sprocket-wheel. The pedal-shaft $e$ is mounted in bearings $a^{14}$, formed in the forward portion of the arms $a^2$ with the pedals $e^2$ disposed in a convenient position for the reception of the feet of the rider. The driving-wheel $e^3$ is mounted upon a shaft $e^6$, journaled in bearing-blocks $e^7$. These bearing-blocks $e^7$ are respectively allowed a free range of vertical movement in ways $a^{15}$, formed in projections $a^{16}$ on the bifurcations $a^6$ and $a^7$ of the backbone $a'$, and are prevented from slipping out of said ways by caps $a^{17}$. The interior surfaces of the ways $a^{15}$ are reamed or otherwise drilled out for the reception of spiral springs $s$, that are interposed between the bearing-blocks $e^7$ and the top walls of the ways $a^{15}$ in order to normally force the roughened tread $e^4$ of the driving-wheel $e^3$ beneath the plane of the runners, as shown in Fig. 1, and into position for engaging with the ice or snow when the sled is loaded. Inasmuch as the boxes $e^7$ are afforded a perfectly free range of motion in a downward direction—i. e., are not forced or held upward by means of springs or rigid connections—it is possible by varying the proportions and design of the springs $s$ to cause the resiliency or recoil thereof to force the roughened tread $e^4$ of the driving-wheel $e^3$ into engagement with the ice or snow over which the sled is traveling in such manner that the maximum rate of speed may be attained by the expenditure of a minimum amount of energy or exertion on the part of the rider—that is to say, in such manner that the roughened tread $e^4$ is embedded in the ice or snow to a depth that is just sufficient for preventing all slipping of the wheel. It will of course be understood that although the degree of pressure with which the roughened tread of the driving-wheel may be forced into contact with the ice or snow may be varied by the employment of springs of different resiliency, still such pressure cannot in any case exceed the weight of the sled and rider, although it may be equal thereto. However, in practice it has been found that the requisite pressure upon the driving-wheel for attaining the best results is very much less than the weight of the sled and rider. The springs $s$ also afford the driving-wheel a slight range of motion, so that it may ride freely and easily over any inequalities that may occur in the path of the sled, and the employment of the sprocket-chain prevents such movements of the driving-wheel from being transferred to the feet of the rider. Ordinarily the periphery of the driving-wheel extends slightly below the plane of the runners, as shown in Fig. 1; but in use the weight of the rider, when seated upon the saddle $a^{12}$, causes the springs $s$ to be compressed and permits the runners $c$ to rest upon the ice or snow, and also causes the roughened tread of the driving-wheel to be forced and held by a yielding pressure into contact therewith.

$f$ is a bell-crank lever pivotally connected with the front post $a^{18}$ of the machine and having one of its arms $f'$ provided with a handle $f^2$, located adjacent to the handles of the steering-head and having the other of its arms bifurcated in order to enage the shaft $e^6$ on opposite sides of the driving-wheel $e^3$, so that the driving-wheel $e^3$ may be lifted up out of contact with the ice or snow by the simple operation of shifting the arm $f'$ of the bell-crank lever $f$ forward.

In use the rider propels the sled by means of the treadles $e^2$ and checks the velocity thereof by means of the operating-lever $c^3$ and its complemental brake mechanism; or, if preferred, the brake mechanism may be dispensed with and the sled stopped by means of the treadles $e^2$. The course of the sled is directed by means of the steering-head $b$ and front runner $c$.

It will be obvious to those skilled in the art to which our invention appertains that modifications may be made in the details—for example, in the form of the body of the sled—without departing from the spirit thereof. Hence we do not limit ourselves to the exact construction and arrangement of parts hereinabove set forth; but,

Having thus described the nature and objects of our present invention, what we claim as new, and desire to secure by Letters Patent, is—

1. The combination, in a sled, of a bifurcated main frame provided with a saddle and a rotatable steering-head, a pedal-shaft journaled in said frame adjacent to said head and provided with a follower sprocket-wheel, a sprocket-chain engaging said sprocket-wheels, adjustable boxes supporting the driving-wheel axle, springs tending to force said boxes downward, and a bell-crank lever pivotally connected with the main frame and having one arm provided with a handle and the other arm bifurcated to engage the driving-wheel shaft on opposite sides of the wheel, substantially as and for the purposes set forth.

2. The combination, in a sled, of a bifurcated main frame provided with a forwardly-extending arm and an adjustable seat, a steering-head rotatably connected with said frame, a pedal-shaft journaled in said arm beneath the steering-head and provided with a driving sprocket-wheel, a driving-wheel provided with a follower sprocket-wheel, a sprocket-chain engaging said sprocket-wheels, boxes supporting the driving-wheel axle and adjustably connected with the respective bifurcations of said frame, and spiral springs tending to maintain said boxes in depressed position, substantially as and for the purposes set forth.

3. The combination, in a sled, of a bifurcated main frame provided with a forwardly-extending arm and a seat, a steering-head rotatably connected with said frame, a pedal-shaft journaled in said arm adjacent to the steering-head and provided with a driving sprocket-wheel, a driving-wheel provided with a follower sprocket-wheel, a sprocket-chain engaging said sprocket-wheels, boxes supporting the driving-wheel axle and afforded a free range of play in a downward direction in slots in the respective bifurcations of said frame, and spiral springs interposed between said boxes and the top walls of said slots, substantially as and for the purposes set forth.

4. The combination, in a sled, of a bifurcated main frame provided with a steering-head, a pedal-shaft journaled in said frame adjacent to the steering-head and provided with a driving sprocket-wheel, a saddle adjustably connected with said frame, a driving-wheel provided with a follower sprocket-wheel, a sprocket-chain engaging said sprocket-wheels, boxes supporting the driving-wheel axle and afforded a free range of play in a downward direction in slots in the respective bifurcations of said frame, spiral springs interposed between said boxes and the top walls of said slots, and a bell-crank lever pivotally connected with the main frame and having one arm provided with a handle and the other arm bifurcated to engage the driving-wheel shaft on opposite sides of the wheel, substantially as and for the purposes set forth.

In witness whereof we have hereunto set our signatures in the presence of two subscribing witnesses.

WILLIAM GUETHLER.
FRANK GELLHAUS.

Witnesses:
RICHARD C. MAXWELL,
THOMAS M. SMITH.